United States Patent [19]
Kardach et al.

[11] 3,798,368
[45] Mar. 19, 1974

[54] PANNING CIRCUIT FOR SURVEILLANCE CAMERA

[75] Inventors: Gerald E. Kardach, South Milwaukee; Robert E. Treleven, Milwaukee, both of Wis.

[73] Assignee: Videosonics, Inc., Milwaukee, Wis.

[22] Filed: Sept. 25, 1972

[21] Appl. No.: 291,877

[52] U.S. Cl...... 178/7.2, 178/DIG. 29, 178/DIG. 38
[51] Int. Cl. ............................................. H04n 5/24
[58] Field of Search....... 178/DIG. 38, 7.2, DIG. 29; 318/626, 627

[56] References Cited
UNITED STATES PATENTS
3,166,699  1/1965  Dalzell............................... 318/627

*Primary Examiner*—Richard Murray
*Attorney, Agent, or Firm*—Wheeler, Morsell, House & Wheeler

[57] ABSTRACT

A surveillance camera is panned back and forth by electric motor means between predetermined clockwise and counterclockwise limits of rotation. The limits of rotation are established by two adjustable reference voltage levels, one of which represents the clockwise limit and the other of which represents the counterclockwise limit. A feedback voltage is generated representing the rotary position of the surveillance camera. When the feedback voltage equals either of the reference voltages, a switching circuit is activated to reverse the camera's direction of rotation. This automatically pans the camera back and forth between the clockwise and counterclockwise limits of rotation established by the reference voltages.

13 Claims, 2 Drawing Figures

3,798,368

PANNING CIRCUIT FOR SURVEILLANCE CAMERA

BACKGROUND OF THE INVENTION

This invention relates to panning surveillance cameras such as used in stores and apartment houses to provide remote surveillance via closed circuit T.V., or to make a film record. More particularly, this invention relates to panning circuits for panning such cameras back and forth to cover a predetermined area of surveillance.

Camera surveillance systems have found wide acceptance in recent years, particularly in stores, warehouses, apartment houses, and other locations that are subject to burglary, shoplifting, etc., In such surveillance systems, panning cameras are mounted at key points within the surveillance area and are typically wired to a remote viewing area where the output of a group of cameras can be viewed simultaneously. This substantially increases the effectiveness of security personnel and permits them to cover much larger surveillance areas than they could without the cameras.

In small or relatively narrow surveillance areas such as hallways, the required visual coverage can be obtained with a fixed camera, but in larger surveillance areas, it is necessary to mount the camera on a rotatable mounting bracket and cause it to pan back and forth across the surveillance area. In the past, this panning action has been effected by means of a panning motor coupled to the camera mounting bracket for rotating the camera back and forth between predetermined limits of rotation. The limits of rotation were set by means of limit switches which were attached to the camera supporting structure in such position as to be mechanically activated at the limit of rotation by cam means attached to the mounting bracket. When the panning camera reached the limit of rotation in one direction, the cam means would close one of the limit switches, and the closure of the limit switch would cause the panning motor to reverse its direction of rotation. At the limit of rotation in the opposite direction, the other limit switch would close and reverse the panning motor again.

Although these prior art limit switch circuits performed their intended function, they had several serious drawbacks. In the first place, the use of limit switches on the camera supporting structure necessitated a relatively awkward and unaesthetic camera supporting structure. Next, the switch contacts were subject to wear and eventual failure from being repeatedly opened and closed by mechanical contact. Finally, it was not possible to adjust the panning limits from a remote location. When the panning limits had to be adjusted, it was necessary to make the adjustment mechanically on the camera mounting structure. This meant that the viewer had no control over the panning limits. If something suspicious was spotted in one sector of the scan, it was not possible to restrict the automatic panning limits to that sector to focus on the suspicious object.

SUMMARY OF THE INVENTION

In accordance with this invention, the above-noted drawbacks have been overcome by providing a solid state electronic limit switching circuit for reversing the direction of the camera electronically at predetermined limits that can be varied from a remote location. A transducer is coupled to the panning motor means to generate a variable voltage level that is proportional to the rotary position of the camera. Two adjustable reference voltages are generated which represent clockwise and counterclockwise limits of rotation for the panning camera. The transducer output is continuously compared to the reference voltages, and when the transducer voltage equals either reference voltage, an electronic switch is activated which reverses the direction of the panning motor means. This automatically pans the camera back and forth between the clockwise and counterclockwise limits of rotation established by the reference voltages.

Accordingly, one object of this invention is to provide an improved panning circuit for panning surveillance cameras.

Another object of this invention is to provide a panning circuit for panning surveillance cameras in which the panning limits can be adjusted from a remote location.

A further object of the invention is to provide a panning circuit for surveillance cameras in which the panning limits are established by adjustable reference voltage levels.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
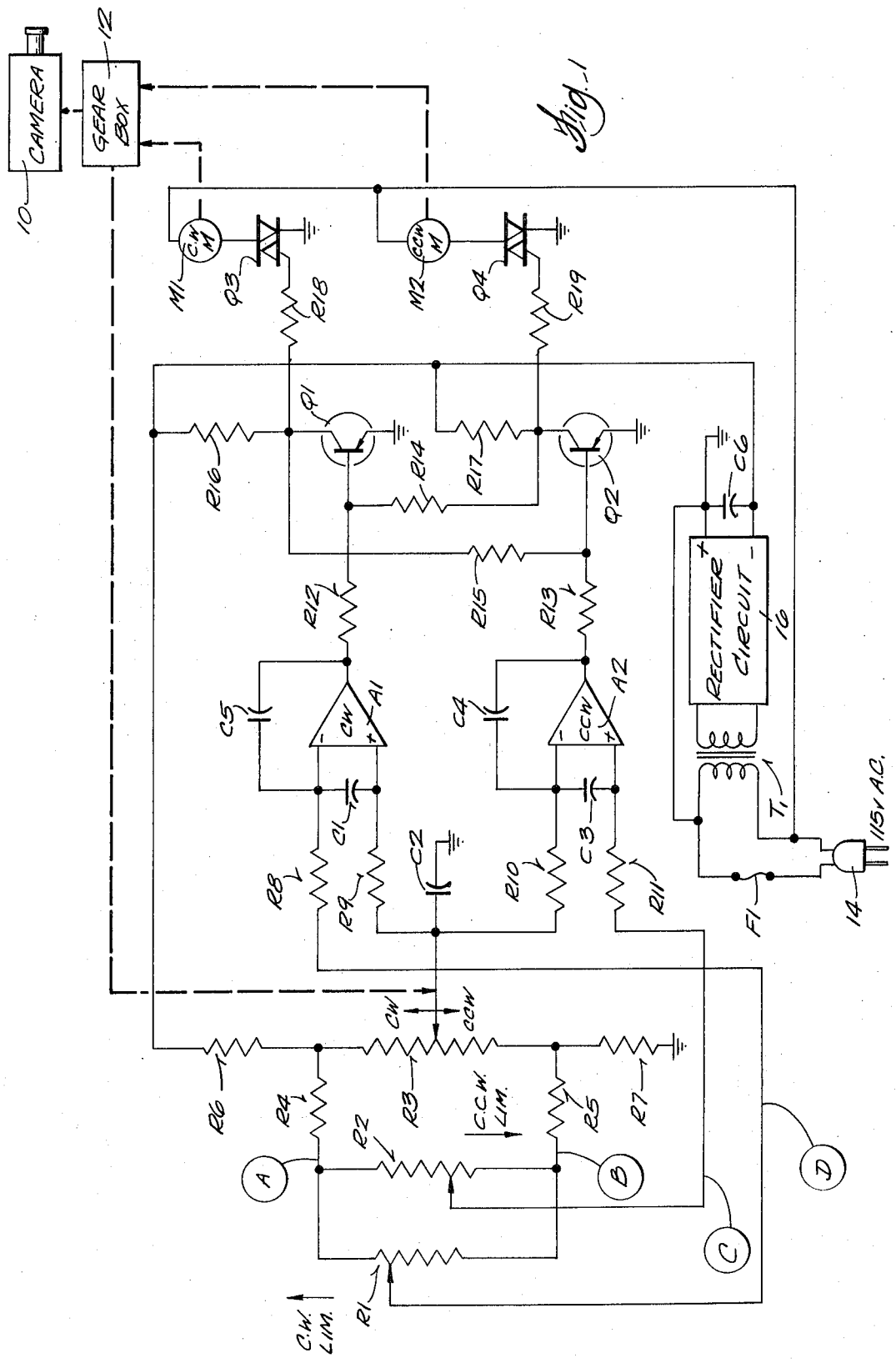
FIG. 1 is a schematic circuit diagram of one illustrative embodiment of the invention which is wired for automatic operation.

Referring to FIG. 1, a panning surveillance camera 10 is mounted for rotation in a surveillance area and is rotated by two a.c. induction motors M1 and M2 which are mechanically coupled to the surveillance camera 10 through a speed reduction gear box 12. When motor M1 is energized by an a.c. current, it turns camera 10 in the clockwise direction, and when motor M2 is energized by an a.c. current, it turns camera 10 in the counterclockwise direction. The motors M1 and M2 are alternately energized by means of triacs Q3 and Q4, whose main current carrying electrodes are coupled in series with motors M1 and M2 and whose gate electrodes are alternately activated by a bistable multivibrator circuit which will be described later. The bistable multivibrator insures that both motors will not be energized at the same time.

The a.c. voltage for the motors M1 and M2 is derived from a power supply containing an a.c. line plug 14, a fuse F1, voltage step-down transformer T1, rectifier circuit 16, and filter capacitor C6. In addition to supplying 115 volts a.c. for the motors M1 and M2, the power supply also supplies −8.5 volts d.c. for the other portions of the circuit. The power supply is, however, entirely conventional in construction and will not be described in detail.

The speed reduction gear box 12 which is coupled between motors M1 and M2 and camera 10 desirably has an output speed of rotation of approximately 1 RPM to give a panning rate of 6° per second. In addition to rotating the camera 10, the gear box 12 also rotates a transducer which produces a variable output voltage that is proportional to the rotary position of camera 10. In this particular embodiment of the invention, the transducer comprises a potentiometer R3 whose resistance element is connected in series with resistors R6 and R7 across the −8.5 d.c. output of the power supply. Resistors R6 and R7 are voltage divider resistors which lower the voltage drop across potentiometer R3 to the input voltage range of two voltage comparator circuits A1 and A2 which will be described later. The gear box 12 moves the arm of potentiometer R3 upward in the drawing for clockwise rotation of camera 10 and downward in the drawing for counterclockwise rotation of the camera 10. This causes the voltage on the arm of potentiometer R3 to vary in accordance with the rotary position of camera 10, with each voltage level corresponding to one and only on rotary position of the camera 10.

Figure 2:
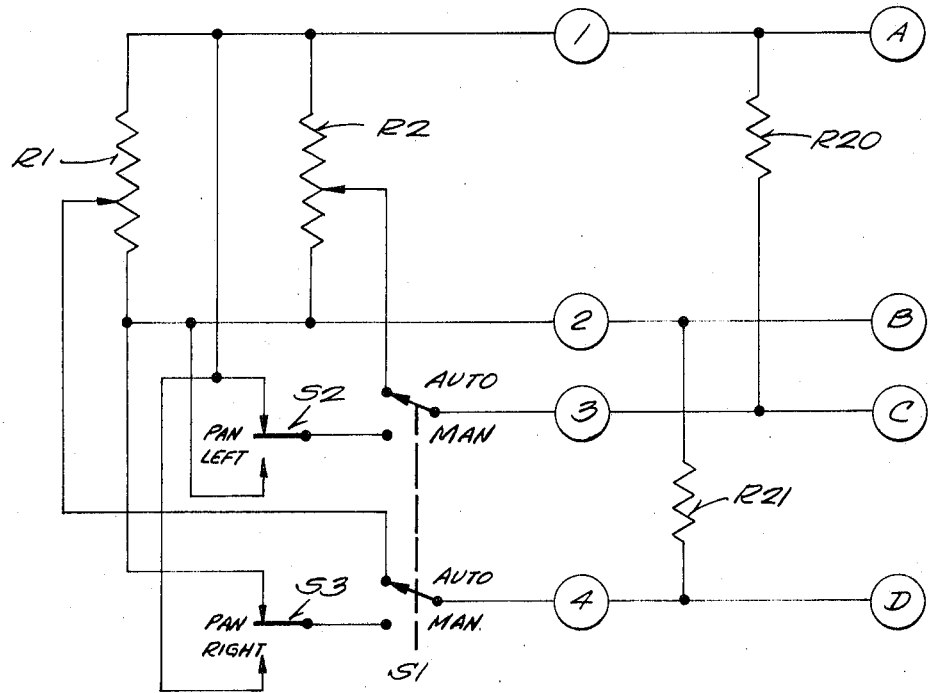
FIG. 2 is a schematic circuit diagram of a remote control unit which can be used in combination with the circuit of FIG. 1 and which is wired for automatic or manual operation.

Two reference voltage dividers such as potentiometers R1 and R2 are coupled in parallel with potentiometer R3 through resistors R4 and R5. The voltage on the arm of potentiometer R1 is an adjustable reference voltage which represents the clockwise limit of rotation of camera 10. The voltage on the arm of potentiometer R2 is an adjustable reference voltage level which represents the counterclockwise limit of rotation for camera 10. These two reference voltage levels can be adjusted manually at the location of potentiometers R1 and R2, which can be placed in a remote location as shown in FIG. 2, if desired and linked to the remainder of the circuit by a cable. The circuit of FIG. 2 has switches for both manual and automatic operation. The AUTO position of switch S1 connects the circuit of FIG. 2 in the same configuration as the circuit of FIG. 1. Accordingly, the following description will apply to both FIG. 1 and FIG. 2 with switch S1 in the AUTO position.

The reference voltages on the arms of potentiometers R1 and R2 are compared with the voltage on the arm of potentiometer R3 in voltage comparators A1 and A2, both of which produce output voltages which are proportional to the difference between the two input voltages. The arm of potentiometer R1 is coupled through resistor R8 to the negative input terminal of voltage comparator A1 and the arm of potentiometer R2 is coupled through resistor R11 to the positive input terminal of voltage comparator A2. The arm of potentiometer R3 is coupled through resistor R9 to the positive input terminal of voltage comparator A1 and through resistor R10 to the negative input terminal of voltage comparator A2. The resistors R8, R9, R10, and R11 act as current limiters for the input to voltage comparators A1 and A2.

Filter capacitors C1, C2, and C3 are coupled to the inputs of voltage comparators A1 and A2, and filter capacitors C4 and C5 are coupled from one input terminal to the output terminal of voltage comparators A1 and A2. The purpose of filter capacitors C1, C2, C3, C4, and C5 is to prevent the voltage comparators A1 and A2 from acting as high gain amplifiers.

The voltage drop across the full resistance element of potentiometers R1 and R2 is slightly smaller than the voltage drop across the full resistance element of potentiometer R3 due to the voltage dropping action of resistors R4 and R5, which insures that the voltage on the arm of potentiometer R3 will be capable of exceeding any voltage that is selected by the arms of potentiometers R1 and R2.

The output of the voltage comparators A1 and A2 is applied through current limiting resistors R12 and R13 to the two inputs of a bistable multivibrator circuit comprising transistors Q1 and Q2 and resistors R14, R15, R16, R17, R18, and R19. When a negative voltage is applied to the base of transistor Q1 or Q2, the base-emitter junction becomes forward biased, which causes the transistor to conduct. When a positive voltage is applied to the base of transistor Q1 or Q2, the base-emitter junction becomes back biased, which causes the transistor to cut off. When transistor Q1 is cut off, −8.5 volts d.c. is applied from the collector of Q1 to one end of resistor R15, which is coupled at its other end to the base of transistor Q2. This causes transistor Q2 to conduct. The −8.5 volts d.c. from the collector of transistor Q1 is also applied to one end of resistor R18, which is coupled at its other end to the gate terminal of triac Q3. This causes triac Q3 to conduct, which energizes motor M1 and causes camera 10 to rotate in the clockwise direction. At the same time, the conduction of transistor Q2 places a ground on one end of resistor R19, which is coupled at its other end to the gate terminal of triac Q4. This holds triac Q4 in the open condition, which blocks energization of motor M2.

When the voltage applied through resistor R12 to the base of transistor Q1 changes from positive to negative, transistor Q1 conducts and its collector potential rises from −8.5 volts d.c. to ground. This opens triac Q3 and blocks the flow of a.c. current through motor M1. At the same time, transistor Q2 is switched from the conducting state to the cut off state by a positive voltage applied to its base through resistor R13. This applies −8.5 volts d.c. to one end of the resistor R19, which causes triac Q4 to conduct and energizes motor M2. This causes camera 10 to rotate in the counterclockwise direction of rotation. Thus the bistable multivibrator circuit acts to switch the direction of camera rotation from clockwise to counterclockwise and vice versa, depending on the output of voltage comparators A1 and A2.

AUTOMATIC OPERATION OF THE CIRCUIT

One complete operating cycle of the circuit will now be described, starting from the initial condition in which the arms of potentiometers R1, R2, and R3 are in the positions shown in the drawing, transistor Q2 is cut off, motor M2 is energized, and camera 10 is rotating in the counterclockwise direction. Under these conditions, the voltage on the arm of potentiometer R2 is positive with respect to the voltage on the arm of potentiometer R3. This makes the output voltage of voltage comparator A2 positive, which holds transistor Q2 in the cut off position.

As the camera 10 rotates in the counterclockwise direction, the voltage on the arm of potentiometer R3 approaches the level of the voltage on the arm of potentiometer R2. When the two voltages are equal, the output of voltage comparator A2 will be zero. When the arm of potentiometer R3 is moved by motor M2 slightly past the position of equality, the output polarity of voltage comparator A2 switches from positive to negative. This causes transistor Q1 to switch from the cut off to the conducting state. At the same time, the −8.5 volt d.c. holding bias applied through resistor R14 to the base of transistor Q1 is removed. This causes the base of transistor Q1 to go positive due to the positive output voltage of voltage comparator A1. When the base of transistor Q1 goes positive, the transistor switches from the conducting state to the cut off state.

The above-noted change in the state of the bistable multivibrator circuit causes triac Q4 to switch off and triac Q3 to switch on. This switches motor M2 off and motor M1 on and changes the direction of rotation of camera 10 from counterclockwise to clockwise. At this point in the operating cycle, the arm of potentiometer R3 is in its lowermost position in the drawing and the output of voltage comparator A2 is negative. The output of voltage comparator A1 is positive.

As the camera 10 rotates in the clockwise direction, the arm of potentiometer R3 moves upwardly in the drawing. The first effect of this movement is to change the output polarity of voltage comparator A2 from negative to positive. However, this does not change the state of transistor Q2 because it is held in the conducting condition by the −8.5 volt d.c. holding bias applied from the collector of transistor Q1 via resistor R15. As the camera 10 continues to rotate in the clockwise direction, the voltage on the arm of potentiometer R3 approaches the level of voltage on the arm of potentiometer R1. When the two voltages are equal, the output of voltage comparator A1 will be zero. When the arm of potentiometer R3 is moved by motor M1 slightly past the position of equality, the output polarity of voltage comparator A1 switches from positive to negative. This causes transistor Q1 to switch from the cut off state to the conducting state and removes the −8.5 volt d.c. holding bias applied through resistor R15 to the base of transistor Q2. Transistor Q2 then switches from the conducting state to the cut off state and applies a −8.5 volt d.c. holding bias to the base of transistor Q1.

The above-noted changes in the bistable multivibrator circuit causes triac Q3 to switch off and triac Q4 to switch on, thereby changing the direction of camera rotation from clockwise back to counterclockwise. This reverses the direction of movement of the arm of potentiometer R3 and changes the output polarity of voltage comparator A1 from negative to positive. This does not affect the state of transistor Q1, however, because it is held in the conducting condition by the −8.5 d.c. holding bias applied from the collector of transistor Q2 via resistor R14. As the camera 10 continues to rotate in the counterclockwise direction, the arm of potentiometer R3 moves downwardly in the drawing. When the arm of potentiometer R3 reaches its central position, the circuit is back to its initial condition and one full cycle of operation has been completed.

The above-noted operating cycle is repeated continuously, thereby rotating camera 10 back and forth between the clockwise and counterclockwise limits of rotation established by the reference voltage levels on the arms of potentiometer R1 and R2. If potentiometers R1 and R2 are located in the remote viewing area, the panning limits can be readily varied by the viewer by simply turning the manual adjustment knobs of potentiometers R1 and R2.

MANUAL OPERATION OF THE CIRCUIT

FIG. 2 shows a remote control unit in which the panning limit adjustment potentiometers R1 and R2 are mounted in a remote location which is linked to the rest of the control circuit by cable. In the case where the remote control unit is to be used, the potentiometers R1 and R2 are removed from the circuit of FIG. 1 and connected as shown in the circuit of FIG. 2. The resistors R20 and R21, which are shown in the circuit of FIG. 2, are coupled in the circuit of FIG. 1 at the points marked A, B, C and D. The cable termination points are indicated by the circled numbers 1 through 4.

The remote control unit contains a switch S1 for selecting either manual (MAN) or automatic (AUTO) operation of the panning circuit. The operation of the circuit with switch S1 in the AUTO position has been described above. With switch S1 in the MAN position, the arms of potentiometers R1 and R2 are disconnected from the circuit and two manual panning switches S2 and S3 are connected in the circuit in their place. Switch S2 is normally coupled to resistor R4 in FIG. 1 and switch S3 is normally coupled to resistor R5 in FIG. 1. This establishes input conditions for voltage comparators A1 and A2 which cause them to produce output voltages that drive transistors Q1 and Q2 both into the conducting state. This grounds out the gate electrodes of both Q3 and Q4 and thus turns motors M1 and M2 both off.

When switch S1 or S2 is moved to the other position, the input comparator A1 or A2 is reversed, which results in an altered input condition that cuts off transistor Q1 or Q2, depending on which switch is operated, thereby firing triac Q3 or Q4, and staring motor M1 or M2. The motor then runs as long as the switch is held open. When the switch is released, it returns to its original condition and the motor stops. Thus, with switch S1 in the MAN (manual) position, the panning movement is stopped and it is possible for a remote operator to turn the camera to the right or to the left by momentarily depressing switch S2 or S3. This makes it possible for the remote operator to focus on any particular angle within the panning sector from the remote location.

From the foregoing description it will be clear that this invention provides an improved panning circuit for surveillance cameras. And although this invention has been described in connection with one illustrative embodiment thereof, it should be understood that this invention is not limited to the disclosed circuit since many modifications can be made in the disclosed circuit without changing its basic principles of operation. For example, although two a.c. motors are used in the disclosed circuit, one for each direction of rotation, they could be replaced, if desired, by a single d.c. motor whose direction of rotation is changed by changing the polarity of the applied voltage. This and other modifications of the disclosed circuit will be apparent to those skilled in the art, and this invention includes all modifications that fall within the scope of the following claims.

We claim:

1. A panning circuit for panning a surveillance camera back and forth between predetermined limits of rotation, said panning circuit comprising electric motor means coupled to said camera for rotating the camera in a clockwise or counterclockwise direction, transducer means coupled to said motor means for generating a feedback voltage which is proportional to the rotary position of said camera, reference voltage means for generating two reference voltages which are respectively proportional to predetermined clockwise and counterclockwise limits of rotation for said camera, voltage comparison means coupled to said transducer and to said reference voltage means for comprising said feedback voltage to said reference voltages and producing an output indication when the feedback voltage is approximately equal to either reference voltage, and electronic switch means coupled between said comparison means and said motor means for switching the direction of motor rotation in accordance with the output indications of said comparison means to pan said camera back and forth between said predetermined clockwise and counterclockwise limits of rotation.

2. A panning circuit as defined in claim 1 in which said transducer comprises a first potentiometer having a resistance element and a movable arm which slides along said resistance element, said movable arm being coupled to said motor means to be moved thereby, and a source of voltage coupled across said resistance element, whereby the voltage on the arm of said first potentiometer comprises said feedback voltage which is proportional to the rotary position of said camera.

3. A panning circuit as defined in claim 2 in which said reference voltage means comprises a second and a third potentiometer each having a resistance element and a movable arm which slides along said resistance element, and a source of voltage coupled across both of said resistance elements, whereby a voltage which is proportional to the positions of said movable arms appears on each of said movable arms, the voltages on said movable arms comprising said reference voltages which are respectively proportional to predetermined clockwise and counterclockwise limits of rotation for said camera.

4. A panning circuit as defined in claim 3 wherein said voltage comparison means comprises a first voltage comparator and a second voltage comparator, each of said comparators having two inputs and being operable to produce an output voltage which is proportional to the difference between the two input voltages, the inputs of said first voltage comparator being coupled to the movable arms of said first and second potentiometers, and the inputs of said second voltage comparator being coupled to the movable arms of said first and third potentiometers.

5. A panning circuit as defined in claim 4 wherein said electronic switch means includes a bistable multivibrator circuit having two inputs and two outputs, the inputs of said multivibrator being coupled to the outputs of said voltage comparators, and means coupled between the output of said multivibrator and said motor means for rotating said camera in the clockwise direction when said multivibrator is in one state and for rotating said camera in the counterclockwise direction when said multivibrator is in the other state.

6. A panning circuit as defined in claim 5 wherein said motor means includes a first motor which, when energized, causes the camera to rotate clockwise, and a second motor which, when energized, causes the camera to rotate counterclockwise, and wherein said electronic switching means includes a first and a second electronic switch element each having two main current carrying electrodes and a gate electrode for switching the current flow between said main current carrying electrodes, the main current carrying electrodes of said first electronic switch element being coupled in series with said first motor and the gate electrode thereof being coupled to one output of said multivibrator, the main current carrying electrodes of said second electronic switch element being coupled in series with said second motor and the gate electrode thereof being coupled to the other output of said multivibrator.

7. A panning circuit as defined in claim 4 wherein said second and third potentiometers are located at a control station remote from the camera whereby the panning limits of the camera are remotely controllable, and further comprising switch means for disconnecting the movable arms of said second and third potentiometers from the input of said first and second voltage comparators and connecting voltages of such magnitude and polarity to the inputs of said first and second voltage comparators as to stop the rotation of said motor means, and switchable circuit means for momentarily altering the input conditions of said first and second voltage comparators to selectively momentarily cause rotation of the motor means in the clockwise or counterclockwise direction of rotation.

8. A panning circuit as defined in claim 1 in which said reference voltage means are located at a control station remote from the camera whereby the panning limits of the camera are remotely controllable.

9. A panning circuit as defined in claim 1 in which said transducer comprises a first voltage divider with a movable element coupled to said motor means to be moved thereby, and a source of voltage for said voltage divider, the voltage output of said voltage divider as established by the position of said movable element comprising said feedback voltage which is proportional to the rotary position of said camera.

10. A panning circuit as defined in claim 9 in which said reference voltage means comprises second and third dividers having movable elements, and a source of voltage for said voltage dividers, whereby voltages proportional to the positions of said movable elements are generated thereby, said generated voltages comprising said reference voltages which are respectively proportional to predetermined clockwise and counterclockwise limits of rotation for said camera.

11. A panning circuit as defined in claim 10 wherein said voltage comparison means comprises a first voltage comparator and a second voltage comparator, each of said voltage comparators having two inputs and being operable to produce an output voltage which is proportional to the difference between the two input voltages, the inputs of said first voltage comparator being coupled to the output of said first and second voltage dividers, and the inputs of said second voltage comparator being coupled to the outputs of the first and third voltage dividers.

12. A panning circuit as defined in claim 11 wherein said electronic switch means inlcudes a bistable multivibrator circuit having two inputs and two outputs, the inputs of said multivibrator being coupled to the outputs of said voltage comparators, and means coupled between the output of said multivibrator and said motor means for rotating said camera in the clockwise direction when said multivibrator is in one state and for rotating said camera in the counterclockwise direction when said multivibrator is in the other state.

13. A panning circuit as defined in claim 12 wherein said motor means includes a first motor which, when energized, causes the camera to rotate clockwise, and a second motor which, when energized, causes the camera to rotate counterclockwise, and wherein said electronic switching means includes a first and a second electronic switch element each having two main current carrying electrodes and a gate electrode for switching the current flow between main current carrying electrodes, the main current carrying electrodes of said first electronic switch element being coupled in series with said first motor and the gate electrode thereof being coupled to one output of said multivibrator, the main current carrying electrodes of said second electronic switch element being coupled in series with said second motor and the gate electrode thereof being coupled to the other output of said multivibrator.

* * * * *